United States Patent
Yeh et al.

(10) Patent No.: US 9,285,838 B2
(45) Date of Patent: Mar. 15, 2016

(54) ELECTRONIC DEVICE

(71) Applicants: Yao-Tsung Yeh, Taipei (TW); Kun-Hsin Liu, Taipei (TW); Wei-Hao Lan, Taipei (TW); Yen-Hsiao Yeh, Taipei (TW); Hong-Tien Wang, Taipei (TW); Shi-Kuan Chen, Taipei (TW); Chun-Huang Yu, Taipei (TW); Shih-Chin Chou, Taipei (TW)

(72) Inventors: Yao-Tsung Yeh, Taipei (TW); Kun-Hsin Liu, Taipei (TW); Wei-Hao Lan, Taipei (TW); Yen-Hsiao Yeh, Taipei (TW); Hong-Tien Wang, Taipei (TW); Shi-Kuan Chen, Taipei (TW); Chun-Huang Yu, Taipei (TW); Shih-Chin Chou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 69 days.

(21) Appl. No.: 14/101,357

(22) Filed: Dec. 10, 2013

(65) Prior Publication Data
US 2014/0168876 A1    Jun. 19, 2014

Related U.S. Application Data

(60) Provisional application No. 61/738,399, filed on Dec. 18, 2012.

(51) Int. Cl.
*G06F 1/16*        (2006.01)

(52) U.S. Cl.
CPC ............ *G06F 1/1666* (2013.01); *G06F 1/1616* (2013.01)

(58) Field of Classification Search
CPC .............................. G06F 1/1666; G06F 1/1616
USPC ................. 361/679.09, 679.12, 680; 455/575
See application file for complete search history.

(56) References Cited

U.S. PATENT DOCUMENTS

| 5,490,037 | A | | 2/1996 | Clancy | |
|---|---|---|---|---|---|
| 5,635,928 | A | * | 6/1997 | Takagi | G06F 1/1616 341/22 |
| 6,314,274 | B1 | * | 11/2001 | Kumagai | H04M 1/0214 361/679.13 |
| 2012/0218699 | A1 | * | 8/2012 | Leung | G06F 1/1616 361/679.08 |

FOREIGN PATENT DOCUMENTS

| CN | 201212962 | 3/2009 |
|---|---|---|
| CN | 101685327 | 3/2010 |
| CN | 202189707 | 4/2012 |
| TW | 200847745 | 12/2008 |
| TW | 201011797 | 3/2010 |

(Continued)

OTHER PUBLICATIONS

"Office Action of Taiwan Counterpart Application", issued on Apr. 8, 2015, p. 1-p. 17.

(Continued)

*Primary Examiner* — Tuan T Dinh
*Assistant Examiner* — Rockshana Chowdhury
(74) *Attorney, Agent, or Firm* — Jianq Chyun IP Office (57) ABSTRACT

An electronic device including a first body, a second body, a linking member, a plurality of keys, and an actuating module is provided. The first body has a display surface and the second body is adapted to be connected to the first body. The linking member is disposed within the second body. The keys are movably connected to the second body. The actuating module is disposed within the second body and located between the linking member and the keys. The linking member moves via a relative movement between the first body and the second body, so that the actuating module pushes the keys to move from the inside of the second body to the outside of the second body.

11 Claims, 7 Drawing Sheets

(56) References Cited

FOREIGN PATENT DOCUMENTS

| | | |
|---|---|---|
| TW | 201032700 | 9/2010 |
| TW | M390491 | 10/2010 |
| TW | 201041000 | 11/2010 |
| TW | 201108912 | 3/2011 |
| TW | 201112286 | 4/2011 |
| TW | M440621 | 11/2012 |

OTHER PUBLICATIONS

"Office Action of Taiwan Counterpart Application", issued on Nov. 12, 2015, p. 1-p. 16.

* cited by examiner

ELECTRONIC DEVICE

CROSS-REFERENCE TO RELATED APPLICATION

This application claims the priority benefits of U.S. provisional application Ser. No. 61/738,399, filed on Dec. 18, 2012. The entirety of the above-mentioned patent applications is hereby incorporated by reference herein and made a part of this specification.

BACKGROUND

1. Field of the Application

The invention relates to an electronic device, more particularly, to an electronic device with keys.

2. Description of Related Art

In recent years, following advances of technology industries, electronic devices such as Notebook Computer, Smart Phone, Tablet PC and so forth have frequently appeared in daily life. Types and functions of the electronic devices have become increasingly diverse, and convenience and practicality make these electronic devices more popular.

The electronic devices often use the keyboard as an input device. For instance, the Tablet PC may be combined with an expansion base having a keyboard, while the Notebook Computer usually includes a display screen and a host base having a keyboard. In general, the keyboard is assembled at a body of the electronic device and protruded out of the body, the protruding portions are being used as pressing strokes when a user is pressing the keys of the keyboard. However, the portions of the keyboard that are protruded out of the body may substantially increase a thickness of the body, and thus are not conducive to the slimmer design of the electronic device.

SUMMARY OF THE APPLICATION

The invention provides an electronic device having keys that may selectively be located inside of a second body so as to reduce a thickness of the second body.

An electronic device of the invention includes a first body, a second body, a linking member, a plurality of keys, and an actuating module. The first body has a display surface, and the second body is adapted to be connected to the first body. The linking member is disposed within the second body. The keys are movably connected to the second body. The actuating module is disposed within the second body and located between the linking member and the keys, wherein the linking member moves via a relative movement between the first body and the second body, so that the actuating module pushes the keys to move from the inside of the second body to the outside of the second body.

In an embodiment of the invention, the second body has a slot, and when the first body is inserted into the slot, the first body pushes the linking member to enable the actuating module to push the keys to move outside the second body.

In an embodiment of the invention, when the first body leaves the slot, the linking member is reset and the keys are returned back to the inside of the second body.

In an embodiment of the invention, the first body is pivoted on the second body and has a cam, and a relative rotation between the first body and the second body moves the linking member via the movement of the cam, so that the actuating module pushes the keys to move outside the second body.

In an embodiment of the invention, the actuating module includes a plurality of actuating units, and each of the actuating units is disposed between the corresponding key and the linking member. Each of the actuating units includes a first magnetic pole, a second magnetic pole and a third magnetic pole. The first magnetic pole and the second magnetic pole are disposed at the corresponding key. The third magnetic pole is disposed at the linking member. A magnetic attraction between the first magnetic pole and the third magnetic pole positions the corresponding key at the inside of the second body, and the relative movement between the first body and the second body can move the linking member to enable a magnetic repulsion between the second magnetic pole and the third magnetic pole to push the corresponding key to move outside the second body.

In an embodiment of the invention, the electronic device further includes a prestressed elastic member disposed between the linking member and the second body, and the relative movement between the first body and the second body and an elastic force of the prestressed elastic member can jointly move the linking member.

In an embodiment of the invention, the actuating module includes a plurality of actuating elastic members, and each of the actuating elastic members is located between the corresponding key and the linking member, wherein the relative movement between the first body and the second body can move the linking member, so that each of the actuating elastic members pushes the corresponding key to move from the inside of the second body to the outside of the second body.

In an embodiment of the invention, the actuating elastic members and the linking member are integrally formed.

In an embodiment of the invention, each of the keys has an accommodating groove, and when the actuating module pushes the keys to move from the inside of the second body to the outside of the second body, each of the actuating elastic members leaves the accommodating groove of the corresponding key so as to push each of the keys into movement.

In an embodiment of the invention, each of the keys is pivoted on the second body, and the relative movement between the first body and the second body moves the linking member, so that the actuating module pushes the keys to rotate from inside of the second body to the outside of the second body.

In an embodiment of the invention, each of the keys has a first side and a second side, wherein the first side is located between the display surface and the second side, and each of the keys is pivoted on the first side.

In an embodiment of the invention, each of the keys has a first side and a second side, wherein the second side is located between a user and the first side, and each of the keys is pivoted on the second side.

In an embodiment of the invention, the electronic device further includes a supporting frame assembled at the second body and has a plurality of supporting elastic members, and each of the keys is assembled at the corresponding supporting elastic member so as to enable each of the keys to move in relative to the second body.

In an embodiment of the invention, the first body is a Tablet PC, and the second body is an expansion base.

In an embodiment of the invention, the first body is a display screen of a Notebook Computer, and the second body is a host base of the Notebook Computer.

In an embodiment of the invention, the linking member is a slide plate.

In view of foregoing, in the electronic device of the invention, the relative movement between the first body and the second body can move the linking member located inside of the second body, so as to enable the actuating module to push the keys to move from the inside of the second body to the outside of the second body. As such, the keys may selectively be located inside of the second body so as to reduce the thickness of the second body.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
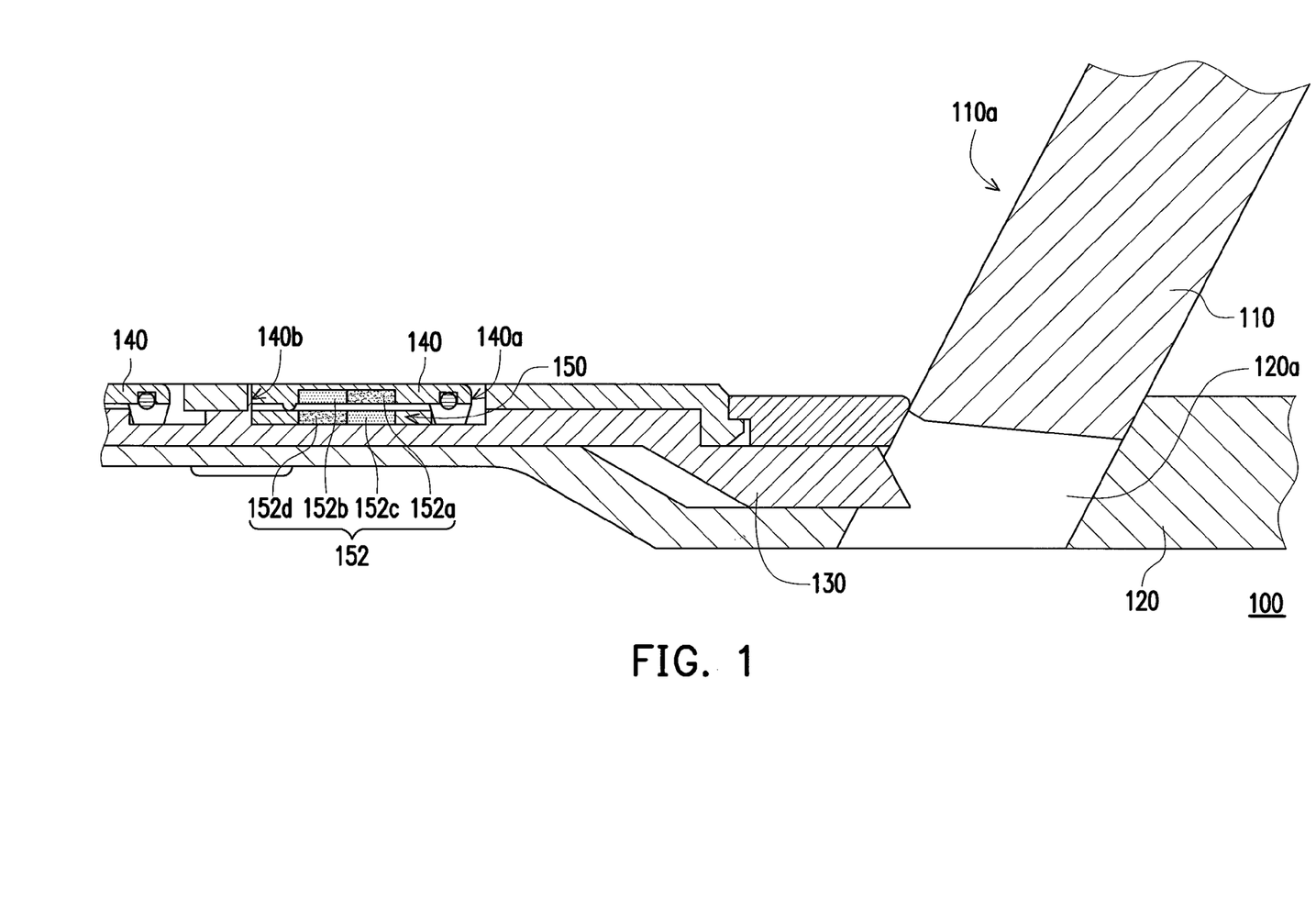
FIG. 1 is a cross-sectional view schematically illustrating an electronic device according to an embodiment of the invention.

FIG. 1 is a cross-sectional view schematically illustrating an electronic device according to an embodiment of the invention. Referring to FIG. 1, an electronic device 100 includes a first body 110, a second body 120, a linking member 130, a plurality of keys 140 and an actuating module 150. The second body 120 is adapted to be connected to the first body 110. The linking member 130 is disposed within the second body 120. The keys 140 are movably connected to the second body 120. The actuating module 150 is disposed within the second body 120 and located between the linking member 130 and the keys 140. In the present embodiment, the first body 110 is a Tablet PC, the second body 120 is an expansion base, and the linking member 130 is a slide plate slidably disposed at the second body 120. As illustrated in FIG. 1, the first body 110 has a display surface 110a which is capable of being a display surface and a touch interface of the Tablet PC. A user may use the first body 110 as the Tablet PC, separately, and operate the first body 110 through the display surface 110a; or the user may connect the first body 110 to the second body 120, and operate the electronic device 100 through the keys 140.

Figure 2:
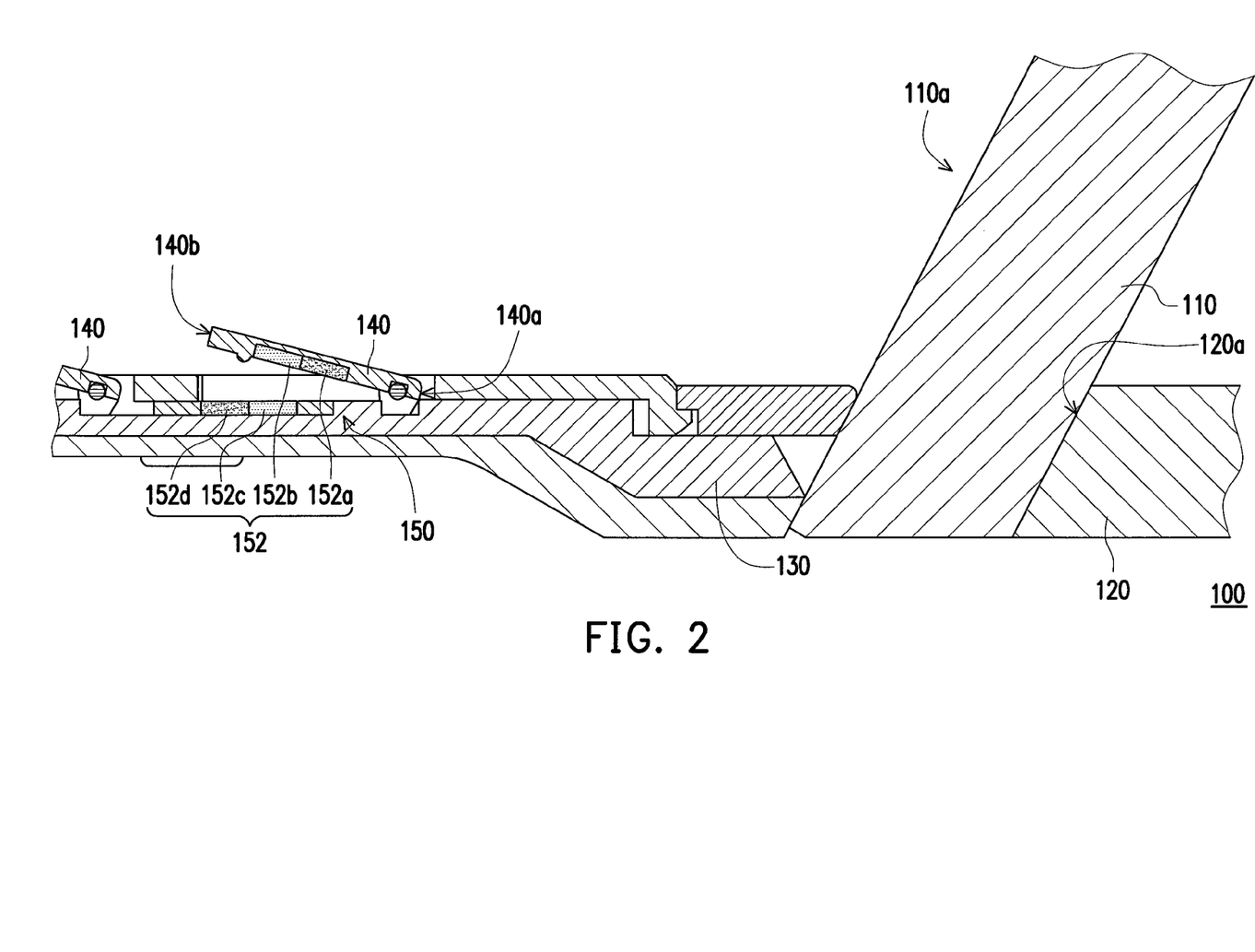
FIG. 2 is a cross-sectional view schematically illustrating keys of FIG. 1 moving to the outside of a second body.

FIG. 1 illustrates that the first body 110 is not connected to the second body 120, while the keys 140 are located inside of the second body 120. FIG. 2 is a cross-sectional view schematically illustrating keys of FIG. 1 moving to the outside of a second body. Referring to FIG. 2, when the user connects the first body 110 to the second body 120, the linking member 130 moves via a relative movement between the first body 110 and the second body 120 (such as translational movement or rotation), so that the actuating module 150 pushes the keys 140 to move from the inside of the second body 120 to the outside of the second body 120. As such, the keys 140 may selectively be located inside of the second body 120, thereby reducing a thickness of the second body 120.

In the present embodiment, when the first body 110 is not connected to the second body 120, the keys 140 are located inside of the second body 120 so as to reduce the thickness of the second body 120. On the other hand, when the first body 110 is connected to the second body 120, the keys 140 move from the inside of the second body 120 to the outside of the second body 120, so as to provide the user with proper pressing strokes. As illustrated in FIG. 2, in the present embodiment, the second body 120 has a slot 120a, and the first body 110 is adapted to be inserted into the slot 120a and thereby connected to the second body 120. When the first body 110 is inserted into the slot 120, the first body 110 pushes the linking member 130 to enable the actuating module 150 to push the keys 140 to the outside of the second body 120.

In the present embodiment, magnetic attraction and magnetic repulsion of a magnet are being used to position the keys 140 within the second body 120 or to move the keys 140 out of the second body 120. Specifically, as illustrated in FIG. 1, the actuating module 150 of the present embodiment includes a plurality of actuating units 152 (of which only one is illustrated in the drawing), and each of the actuating units 152 is disposed between the corresponding key 140 and the linking member 130. In other words, each of the keys 140 has one corresponding actuating unit 152. Each of the actuating units 152 includes a first magnetic pole 152a, a second magnetic pole 152b, a third magnetic pole 152c, and a fourth magnetic pole 152d. In the present embodiment, the first magnetic pole 152a and the second magnetic pole 152b may be constituted of a magnetic element, while the third magnetic pole 152c and the fourth magnetic pole 152d may be constituted of another magnetic element, but the invention is not limited thereto.

In terms of each of the actuating units 152, the first magnetic pole 152a and the second magnetic pole 152b are disposed at the corresponding key 140, while the third magnetic pole 152c and the fourth magnetic pole 152d are disposed at the linking member 130. As illustrated in FIG. 1, when the first body 110 is not connected to the second body 120, the third magnetic pole 152c is located below the first magnetic pole 152a, and the fourth magnetic pole 152d is located below the second magnetic pole 152b. As such, the magnetic attraction between the first magnetic pole 152a and the third magnetic pole 152c and the magnetic attraction between the second magnetic pole 152b and the fourth magnetic pole 152d position the corresponding key 140 within the second body 120.

Next, referring to FIG. 2, the linking member 130 moves via the relative movement between the first body 110 and the second body 120, thereby further drives the third magnetic pole 152c and the fourth magnetic pole 152d that are disposed at the linking member 130. As such, the third magnetic pole 152c is to be moved under the second magnetic pole 152b, and the magnetic repulsion between the second magnetic pole 152b and the third magnetic pole 152c pushes the corresponding key 140 to move outside the second body 120. In the present embodiment, each of the keys 140 is pivoted on the second body 120, and the linking member 130 moves via the relative movement between the first body 110 and the second body 120, so that the actuating module 150 pushes the keys 140 to rotate from the inside of the second body 120 to the outside of the second body 120.

In the present embodiment, when the first body 110 leaves the slot 120*a* of the second body 120, the linking member 130 is reset and the keys 140 are returned back to the inside of the second body 120. Specifically, when the first body 110 leaves the slot 120*a*, the linking member 130 is to be returned to the starting position (such as the position illustrate in FIG. 1). Now, the third magnetic pole 152*c* of the actuating module 150 is located below the first magnetic pole 152*a*, and the fourth magnetic pole 152*d* is located below the second magnetic pole 152*b*, so that the corresponding key 140 may be reset back to the inside of the second body 120 through using the magnetic attraction.

It is to be explained that, in the embodiment shown in FIG. 1, each of the keys 140 is pivoted on the second body 120, and the user may experience rotational feelings when pressing the keys 140. In addition, in the embodiment shown in FIG. 1, each of the keys 140 has a first side 140*a* and a second side 140*b*, wherein the first side 140*a* is located between the display surface 110*a* and the second side 140*b*, and each of the keys 140 is pivoted on the first side 140*a*. As such, the keys 140 is to be rotated toward the display surface 110*a* when being moved out of the second body 120. Certainly, the pivoting method of the keys 140 is not limited to above; in another embodiment, each of the keys has a first side and a second side, wherein the second side is located between the user and the first side, and each of the keys is pivoted on the second side. As such, the keys are to be rotated toward the user when being moved out of the second body.

Figure 3:
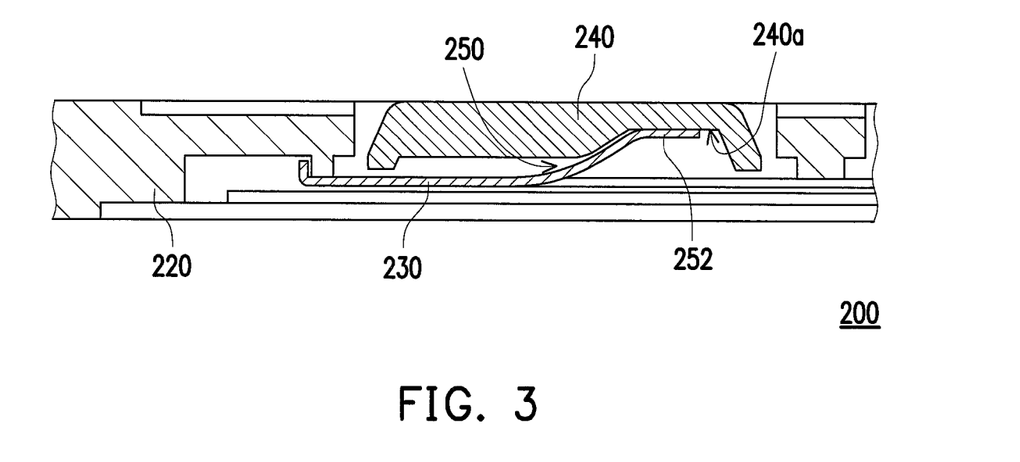
FIG. 3 is a cross-sectional view schematically illustrating an electronic device according to another embodiment of the invention.

FIG. 3 is a cross-sectional view schematically illustrating an electronic device according to another embodiment of the invention. The embodiment of FIG. 3 is similar to the embodiment of FIG. 1, and a main difference between the two is that, the embodiment of FIG. 1 employs the magnetic attraction and the magnetic repulsion of the magnet to enable the keys to be positioned within the second body or move to the outside of the second body, while the embodiment of FIG. 3 employs an elastic force to enable the keys to move outside the second body. It is to be explained that, the relative movement between the first body and the second body in the embodiment of FIG. 3 is the same as that of the embodiment of FIG. 1, and thus is not to be repeated herein. Referring to FIG. 3, an electronic device 200 includes a first body (not shown), a second body 220, a linking member 230, a plurality of keys 240 (of which only one is illustrated in the drawing), and an actuating module 250. The linking member 230 is slidably disposed within the second body 220. The keys 240 are movably connected to the second body 220. The actuating module 250 is disposed within the second body 220 and located between the linking member 230 and the keys 240. In the present embodiment, the linking member 230 is a slide plate slidably disposed at the second body 220.

Specifically, the actuating module 250 of the present embodiment includes a plurality of actuating elastic members 252 (of which only one is illustrated in the drawing), and each of the actuating elastic members 252 is located between the corresponding key 240 and the linking member 230. In other word, each of the keys 240 has a corresponding actuating elastic member 252. FIG. 3 illustrates that the keys 240 are located inside of the second body 220. In the present embodiment, each of the keys 240 has an accommodating groove 240*a*, and when the keys 240 are located inside of the second body 220, each of the actuating elastic members 252 is fixed in the accommodating groove 240*a* of the corresponding key 240.

Figure 4:
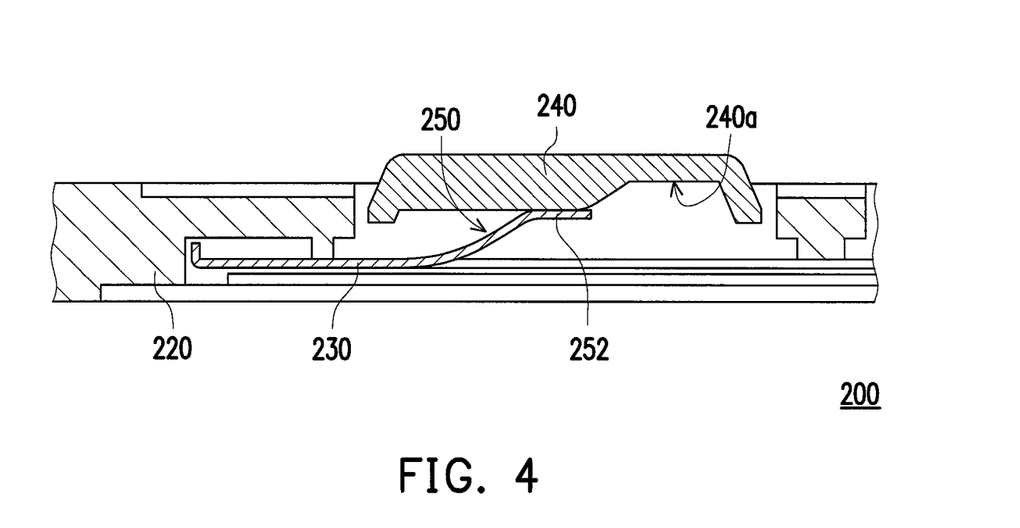
FIG. 4 is a cross-sectional view schematically illustrating keys of FIG. 3 moving to the outside of a second body.

FIG. 4 is a cross-sectional view schematically illustrating keys of FIG. 3 moving to the outside of a second body. Referring to FIG. 4, the relative movement between the first body (not shown) and the second body 220 can move the linking member 230, thereby further drive the actuating elastic members 252 disposed at the linking member 230. As such, each of the actuating elastic members 252 is to leave the corresponding accommodating groove 240*a*, and the elastic forces of the actuating elastic members 252 may push the corresponding keys 240 to move from the inside of the second body 220 to the outside of the second body 220. In the present embodiment, the actuating elastic members 252, for example, are elastic pieces and may be integrally formed with the linking member 230, thereby having an advantage of cost saving.

Figure 5:
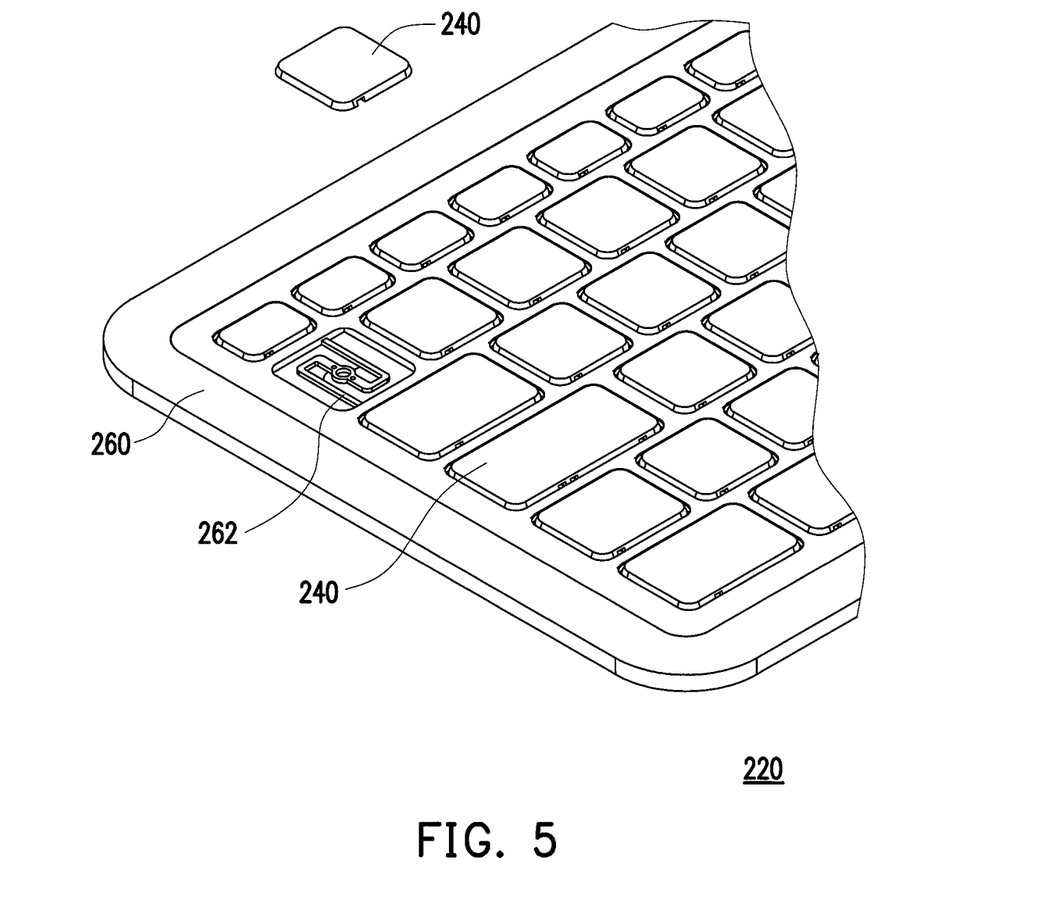
FIG. 5 is a partial exploded view schematically illustrating the second body of FIG. 3.

FIG. 5 is a partial exploded view schematically illustrating the second body of FIG. 3. Referring to FIG. 5, the electronic device 200 of the present embodiment further includes a supporting frame 260. The supporting frame 260 is assembled at the second body 220, and has a plurality of supporting elastic members 262 (of which only one is illustrated in the drawing), wherein each of the keys 240 is assembled at the corresponding supporting elastic member 262. As such, when the keys 240 are located at the inside of the second body 220, the keys 240 may be fixed at the corresponding supporting elastic members 262. On the other hands, when the keys 240 are moved to the outside of the second body 220, the elastic forces and the deformations of the supporting elastic members 262 may provide the corresponding keys 240 with pressing strokes required for performing movements. In the present embodiment, the supporting elastic members 262 are Z-shaped; but in the other embodiments, the supporting elastic members 262 may be of other shapes, such as U-shape.

As compared to the embodiment of FIG. 1 where the keys 140 are pivoted on the second body 120, in the present embodiment, each of the keys 240 is assembled at the corresponding supporting elastic member 252, and the user may experience vertically up-and-down feelings when pressing the keys 240. As such, the keys of the invention have favorable design flexibility for providing the user with different operating feelings.

Figure 6:
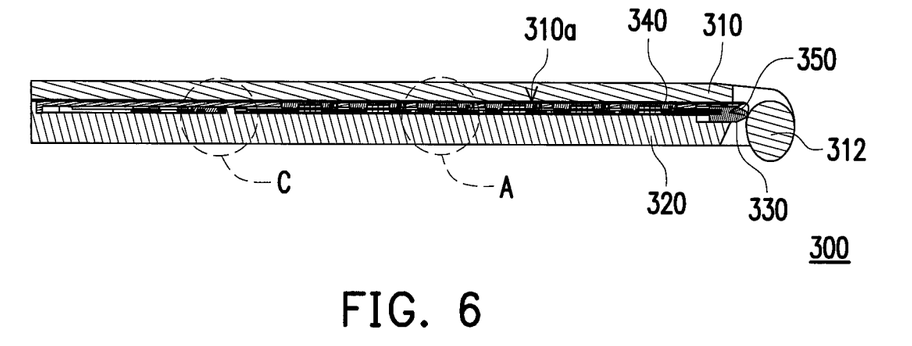
FIG. 6 is a cross-sectional view schematically illustrating an electronic device according to another embodiment of the invention.

FIG. 6 is a cross-sectional view schematically illustrating an electronic device according to another embodiment of the invention. Referring to FIG. 6, an electronic device 300 includes a first body 310, a second body 320, a linking member 330, a plurality of keys 340, and an actuating module 350. The second body 320 is adapted to be connected to the first body 310. The linking member 330 is disposed within the second body 320. The keys 340 are movably connected to the second body 320. The actuating module 350 is disposed within the second body 320 and located between the linking member 330 and the keys 340. In the present embodiment, the electronic device 300 is taken as a Notebook Computer for a purpose of description, wherein the first body 310 is a display screen of the Notebook Computer and has a display surface 310*a*, and the second body 320 is a host base of the Notebook Computer. In addition, the present embodiment has taken the linking member 330 as a slide plate for the purpose of description, and the slide plate is slidably disposed at the second body 320. In the present embodiment, the first body 310 is pivoted at the second body 320 and has a cam 312.

Figure 7:
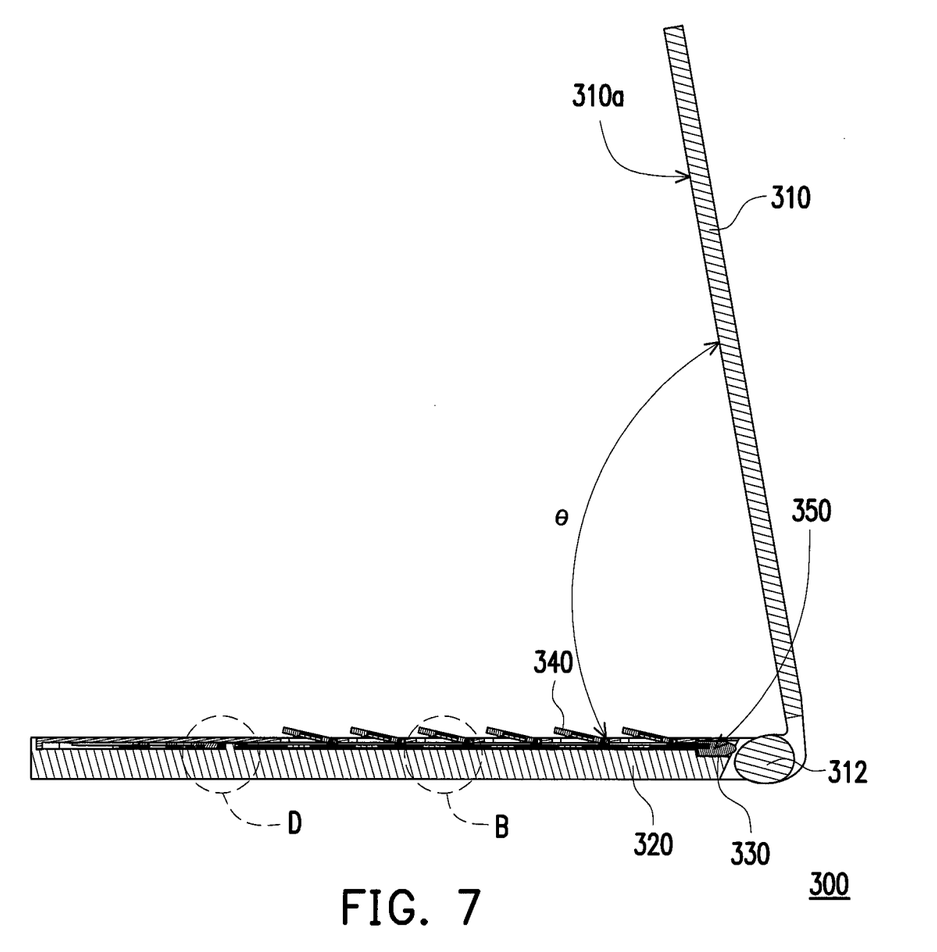
FIG. 7 is a cross-sectional view schematically illustrating keys of FIG. 6 moving to the outside of a second body.

FIG. 6 illustrates that the first body 310 is closed onto the second body 320 in relative thereto, and the keys 340 are located inside of the second body 320. FIG. 7 is a cross-sectional view schematically illustrating keys of FIG. 6 moving to the outside of a second body. Referring to FIG. 7, when the first body 310 rotates in relative to the second body 320, the cam 312 moves the linking member 330 to enable the actuating module 350 to push the keys 340 to move outside the second body 320. As such, the keys 340 may selectively be located inside of the second body 320, thereby reducing a thickness of the second body 320.

In the present embodiment, the first body 310 and the second body 320, for example, has an opening angle θ therebetween, and when the angle between first body 310 and the second body 320 is smaller than the opening angle θ, the cam 312 does not contact the linking member 330 and does not move the linking member 330. At this time, the keys 340 are located inside of the second body 320 to reduce the thickness of the second body 320. When the angle between the first body 310 and the second body 320 reaches the opening angle θ, the cam 312 contacts the linking member 330 and moves the linking member 330, so that the actuating module 350 pushes the keys 340 to move outside the second body 320. It is to be explained that, the design of the cam 312 may be changed according to the size of the opening angle θ.

Figure 8:
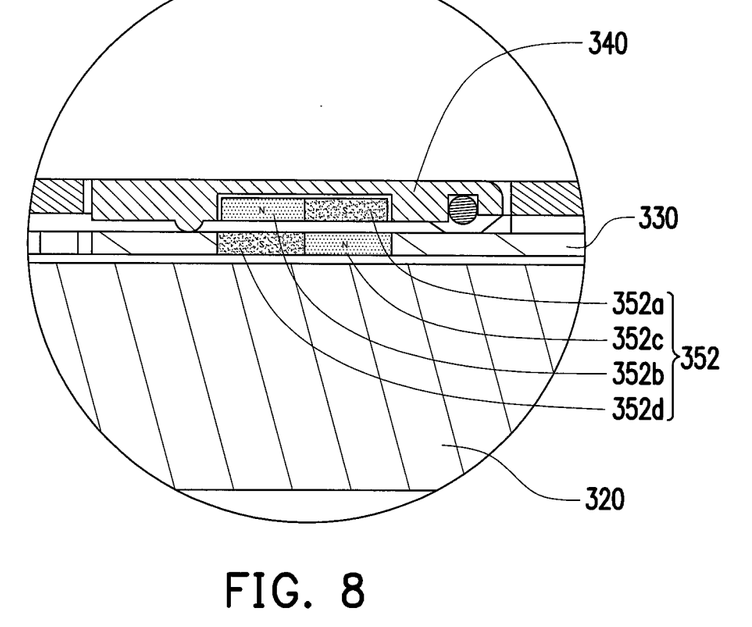
FIG. 8 is a partial enlarged view schematically illustrating portion A of FIG. 6.

The present embodiment employs the magnetic attraction and the magnetic repulsion of the magnet to enable the keys 340 to be located inside of the second body 320 or to move outside the second body 320. FIG. 8 is a partial enlarged view schematically illustrating portion A of FIG. 6. Referring to FIG. 6 and FIG. 8 at the same time, the actuating module 350 of the present embodiment includes a plurality of actuating units 352 (of which only one is illustrated in the drawing), each of the actuating units 35 is disposed between the corresponding key 340 and the linking member 330. Each of the actuating units 352 includes a first magnetic pole 352a, a second magnetic pole 352b, a third magnetic pole 352c, and a fourth magnetic pole 352d. In each of the actuating units 352, the first magnetic pole 352a and the second magnetic pole 352b are disposed at the corresponding key 340, while the third magnetic pole 352c and the fourth magnetic pole 352d are disposed at the linking member 330. The magnetic attraction between the first magnetic pole 352a and the third magnetic pole 352c and the magnetic attraction between the second magnetic pole 352b and the fourth magnetic pole 352d position the corresponding key 340 within the second body 220.

Figure 9:
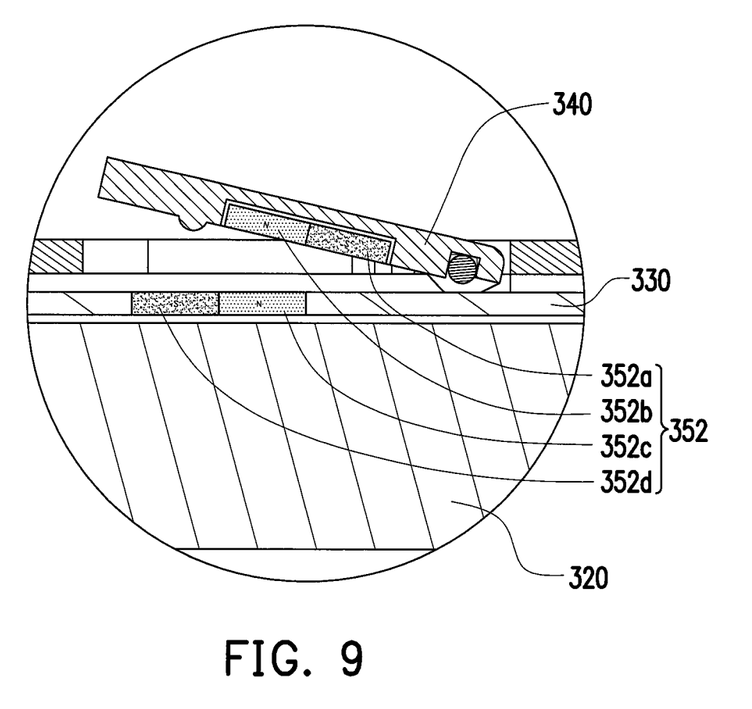
FIG. 9 is a partial enlarged view schematically illustrating portion B of FIG. 7.

FIG. 9 is a partial enlarged view schematically illustrating portion B of FIG. 7. Referring to FIG. 7 and FIG. 9 at the same time, when the first body 310 rotates in relative to the second body 320, the cam 312 moves the linking member 330, thereby further drives the third magnetic pole 352c and the fourth magnetic pole 352d that are disposed at the linking member 330. As such, the third magnetic pole 352c is to be moved under the second magnetic pole 352b, and the magnetic repulsion between the second magnetic pole 352b and the third magnetic pole 352c pushes the corresponding key 340 to move outside the second body. In the present embodiment, each of the keys 340 is pivoted on the second body 320, and thus the user may experience rotational pressing feelings when pressing the keys 34.

It is to be explained that, the present embodiment employs the magnetic attraction and the magnetic repulsion of the magnet to enable the keys 340 to be located inside of the second body 320 or to move outside the second body 320. However, the present embodiment may also employs the elastic force to enable the keys 340 to move outside the second body 320. This part of description may be referred to the embodiment of FIG. 3, and thus is not to be repeated herein.

Figure 10:
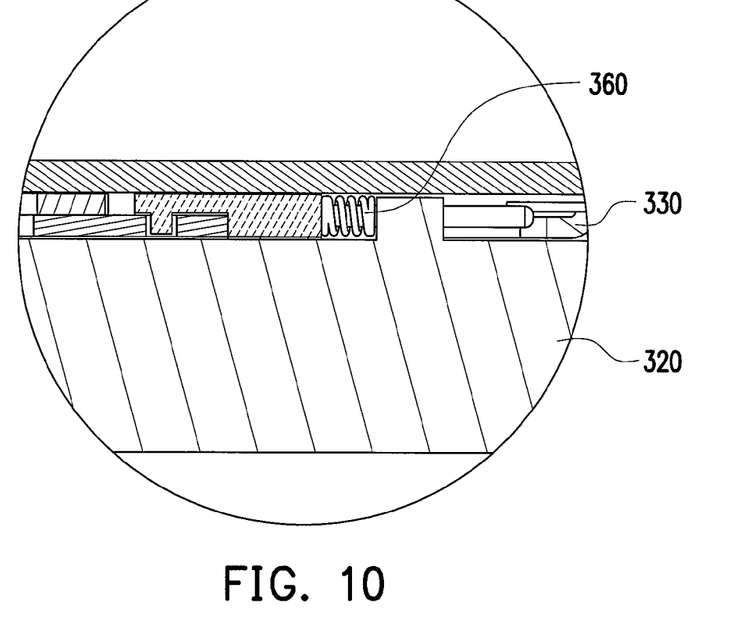
FIG. 10 is a partial enlarged view schematically illustrating portion C of FIG. 6.
Figure 11:
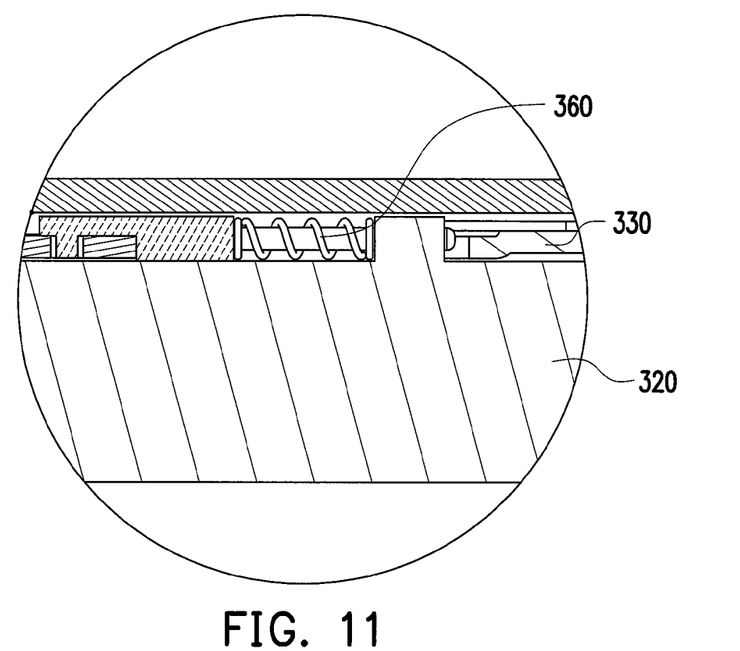
FIG. 11 is a partial enlarged view schematically illustrating portion D of FIG. 7.

FIG. 10 is a partial enlarged view schematically illustrating portion C of FIG. 6. Referring to FIG. 6 and FIG. 10 at the same time, the electronic device 300 further includes a prestressed elastic member 360 disposed between the linking member 330 and the second body 320. When the keys 340, as illustrated in FIG. 6, are located inside of the second body 320, the prestressed elastic member 360 is subjected to pressure and thereby stores an elastic potential energy. FIG. 11 is a partial enlarged view schematically illustrating portion D of FIG. 7. Referring to FIG. 7 and FIG. 11 at the same time, when the first body 310 moves in relative to the second body 320, the elastic potential energy of the prestressed elastic member 360 can be released, and the then relative movement between the first body 310 and the second body 320 and the elastic force of the prestressed elastic member 360 can jointly move the linking member 330. As such, the prestressed elastic member 360 may be employed to push the linking member 330, thereby reducing the repulsion force of the cam 312 against the linking member 330.

In summary, in the electronic device of the invention, the relative movement between of the first body and the second body can move the linking member located inside the second body, so that the actuating module pushes the keys to move from the inside of the second body to the outside of the second body. As such, the keys may selectively be located inside the second body, thereby reducing the thickness of the second body.

The electronic device of the invention may be a combination of a Tablet PC and an expansion base, or a Notebook Computer. When the electronic device is the combination of the Tablet PC and the expansion base, and when the Tablet PC is inserted into the expansion base, the Tablet PC may move the linking member located at the expansion base, so that the actuating module pushes the keys to move from the inside of the second body to the outside of the second body. When the electronic device is the Notebook Computer, a relative rotation between the display screen and the host base thereof may move the linking member located at the expansion base, so that the actuating module pushes the keys to move from the inside of the second body to the outside of the second body. Therefore, the first body and the second body of the electronic device of the invention may have different relative movements for moving the keys from inside of the second body to the outside of the second body. Moreover, the actuating module may use the magnetic force or the elastic force to enable the keys to move from the inside of the second body to the outside of the second body, and the pressing strokes of the keys may be rotational or vertically up-and-down. As such, the electronic device of the invention has favorable design flexibility.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. An electronic device, comprising:
   a first body having a display surface;
   a second body adapted to be connected to the first body;
   a linking member disposed within the second body;
   a plurality of keys movably connected to the second body; and
   an actuating module disposed within the second body and located between the linking member and the keys, wherein the linking member moves via a relative movement between the first body and the second body, so that the actuating module pushes the keys to move from the inside of the second body to the outside of the second body, and the actuating module is in contact with each of the keys, wherein the actuating module comprises:

a plurality of actuating units, each of the actuating units disposed between the corresponding key and the linking member, each of the actuating units comprising:

a first magnetic pole disposed at the corresponding key;

a second magnetic pole disposed at the corresponding key; and a third magnetic pole disposed at the linking member, wherein a magnetic attraction between the first magnetic pole and the third magnetic pole positions the corresponding key at the inside of the second body, and the relative movement between the first body and the second body moves the linking member to enable a magnetic repulsion between the second magnetic pole and the third magnetic pole to push the corresponding key to move outside the second body.

2. The electronic device as recited in claim 1, wherein the second body has a slot, and when the first body is inserted into the slot, the first body pushes the linking member to enable the actuating module to push the keys to move to the outside of the second body.

3. The electronic device as recited in claim 2, wherein when the first body leaves the slot, the linking member is reset and the keys are returned back to the inside of the second body.

4. The electronic device as recited in claim 1, wherein the first body is pivoted on the second body and has a cam, and a relative rotation between the first body and the second body moves the linking member via the movement of the cam, so that the actuating module pushes the keys to move to the outside the second body.

5. The electronic device as recited in claim 1, further comprising:

a prestressed elastic member disposed between the linking member and the second body, the relative movement between the first body and the second body and an elastic force of the prestressed elastic member jointly move the linking member.

6. The electronic device as recited in claim 1, wherein each of the keys is pivoted on the second body, and the relative movement between the first body and the second body moves the linking member, so that the actuating module pushes the keys to rotate from the inside of the second body to the outside of the second body.

7. The electronic device as recited in claim 6, wherein each of the keys has a first side and a second side, wherein the first side is located between the display surface and the second side, and each of the keys is pivoted on the first side.

8. The electronic device as recited in claim 6, wherein each of the keys has a first side and a second side, wherein the second side is located between a user and the first side, and each of the keys is pivoted on the second side.

9. The electronic device as recited in claim 1, wherein the first body is a Tablet PC, and the second body is an expansion base.

10. The electronic device as recited in claim 1, wherein the first body is a display screen of a Notebook Computer, and the second body is a host base of the Notebook Computer.

11. The electronic device as recited in claim 1, wherein the linking member is a slide plate.

* * * * *